Dec. 18, 1962   R. S. BRUMM   3,068,883
REGULATOR
Filed April 27, 1960
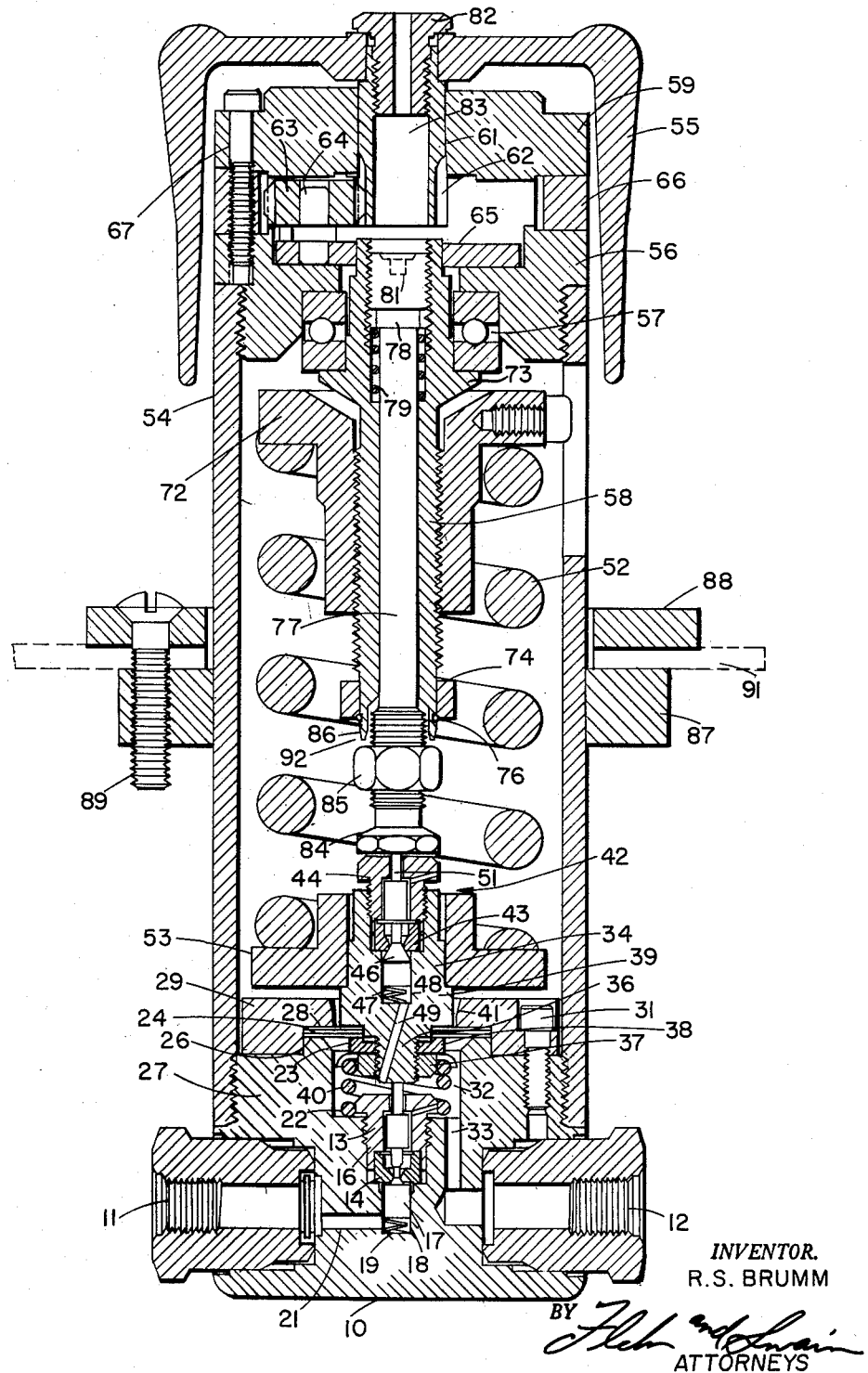
INVENTOR.
R.S. BRUMM
BY
ATTORNEYS

United States Patent Office 3,068,883
Patented Dec. 18, 1962

3,068,883
REGULATOR
Richard S. Brumm, Oakland, Calif., assignor to Grove Valve and Regulator Company, Oakland, Calif., a corporation of California
Filed Apr. 27, 1960, Ser. No. 25,094
5 Claims. (Cl. 137—116.5)

This invention relates generally to apparatus or devices for regulating the flow of various fluids. More particularly it pertains to regulating devices capable of maintaining a desired gas pressure in a fluid pressure system.

In Patent 2,342,659, there is shown a small capacity regulator capable of adjustment over a wide range of outlet pressures, and incorporating both pressure reducing and pressure relief valve means. By changing the setting of a hand wheel or other operating member, the device can be adjusted to maintain a desired outlet pressure. Should the outlet pressure increase beyond predetermined pressure limits, the relief valve means is operated thereby to vent off pressure until the outlet is within the pressure limits desired. Assuming that such devices are constructed to operate at inlet pressures ranging up to 10,000 p.s.i., or higher, certain structural and operating problems are involved. The pressure operated diaphragm of the device should be limited in its flexing movement, to avoid diaphragm injury. Generally the relief valve means is adjusted by the setting of a rod. If this rod is adjusted whereby within the limits of movement of the diaphragm, the relief valve means is not operated, then excessive and dangerous pressure may develop on the outlet side.

In general it is an object of the present invention to provide a regulating device of the above character having improved means for limiting movements of the diaphragm, and to prevent an adjustment that will make the relief valve means inoperative.

Another object of the invention is to provide a device of the above character having limiting means which can be set during assembly for accurately limiting movement of the certain parts.

Another object of the invention is to provide a regulating device of the above character having means serving to avoid injury to mechanical parts under extreme operating conditions.

Additional objects and features of the invention will appear from the following description in which the preferred embodiments have been set forth in detail in conjunction with the accompanying drawing.

FIGURE 1 is a side elevational view in section illustrating a regulating device incorporating the present invention.

Referring first to that form of the invention illustrated in FIGURE 1, the device consists of a body part 10 provided with inlet and outlet passages 11 and 12. The inlet passage is adapted for connection with a source of high pressure air or other gas, such as one or more pressure flasks or tanks. The outlet passage 12 is adapted for connection with a pressure system which may be maintained at a relatively high pressure level, but lower than the high pressure side. The lower pressure system may either be closed, or it may be such that gas is admitted or discharged form the same.

The interior of the body serves to mount the pressure reducing valve means 13. This valve means can consist of a seat ring 14, held in place by the threaded retainer 16. A valve member 17 is loosely disposed within the bore 18, and is urged toward closed positon with respect to the seat ring 14 by compression spring 19. Duct 21 connects inlet passage 11 with one end of the bore 18.

The retainer 16 loosely accommodates the thrust pin 22, which is adapted to be moved to dislodge the valve member 17 from its seat. The diaphragm assembly 23, which serves to operate the reducing valve means 13, consists of a flexible diaphragm element 24, which may be of the laminated type as illustrated. A peripheral margin of the diaphragm element is clamped between the annular shoulder 26 and the body portion 27, and the annular shoulder 28 formed on clamping ring 29. This ring is clamped against the body portion 27 by suitable means such as the screws 31. The space 32 on one side of the flexible diaphragm element 24, is in communication with the outlet passage 12, through the duct 33.

The diaphragm assembly also includes a rigid member 34 upon the other side of the diaphragm element, which has a threaded stud portion 36 extending through the diaphragm. The stud portion 36 is engaged by the nut 37, which serves to force the clamping collar 38 against the peripheral portion of the diaphragm element.

The member 34 has a cylindrical shaped portion 39, which slidably interfits the bore 41 in the clamp ring 29. The entire diaphragm assembly is urged upwardly by the compression spring 40.

The rigid member 34 serves to carry the relief valve means 42, which can consist of a seat ring 43 that is clamped and held in place by the threaded retainer 44. A valve member 46 cooperates with the seat 43, and is urged toward closed position by the compression spring 47. The bore 48 within which the valve member 46 is disposed, is in communication with the space 32, through the duct 49. A thrust pin 51 is slidably disposed within the fitting 44, and is adapted to be engaged and moved toward the diaphragm, to move the valve member 46 from its seat.

The loading means for the diaphragm assembly consists of a compression spring 52, one end of which is seated upon a collar 53 that is carried by the rigid member 34. The compression spring and cooperating parts are enclosed within a shell or casing 54, one end of which has threaded engagement with the body portion 27. The other end of the shell serves to carry the adjusting hand wheel 55, together with reduction gear means. The reduction gear means in this instance is of the planetary type. Thus an end mounting member 56 has threaded engagement with the casing 54, and serves to seat the bearing assembly 57. An end mounting member 59 is bored to form a bearing for the shaft 61, the inner end of which forms the pinion gear 62. The hand wheel 55 is fixed to the exterior end of shaft 61. Pinion 62 engages the planet gear 63, which is rotatably carried by a pin 64, the latter being secured to the drive plate 65. Planet gear 63 engages the ring gear 66, which is clamped between the members 56 and 59, as by means of the clamping screws 67. With this construction, rotation of the hand wheel 55 serves to rotate the drive plate 65 and thus the stem 58, through the gear reduction formed by pinion 62, planet gear 63, and the ring gear 66.

A flanged nut 72 forms a seat for the other end of the compression spring 52, and has threaded engagement with the stem 58. Thus when the stem 58 is rotated by rotation of the hand wheel 54, the nut 72 is moved longitudinally of the stem, to adjust the force of the spring 52 upon the diaphragm. It is desirable to limit movement of this nut in either direction. Thus shoulder 73 on stem 58 is engaged when the nut is moved in a direction to decrease the force of the spring. When moved in the opposite direction, the nut may engage the limiting collar 74, which is carried by the stem 58, and held in place by suitable means such as the snap-in ring 76.

With the stem 58, there is a relief valve adjusting rod 77, the function of which is to provide adjustable means for changing the sensitivity of response of the relief valve means to pressure changes on the downflow side. One end of this rod engages a thrust disc which is urged in one direction by the small compression spring 79. The disc 78 is engaged by the adjustable screw 81, which can be engaged for adjustment by insertion of a suitable tool through cap 82 and the shaft passage 83. The other end of the rod 77 is provided with an enlarged portion 84, which is adapted to engage the pin 51 and to form an adjustable stop for movement of the diaphragm assembly. The rod 77 also carries an adjustable abutment member 85, which is adapted to engage the adjacent end 86 of the stem 58. The abutment member 85 in this instance is in the form of a nut, which is threaded upon the rod, and which can be preset to a desired position upon rod 77. Suitable means (not shown) is employed to provide friction against rotation of this nut, whereby it maintains a desired setting.

Various expedients can be used for mounting the device when in use. Thus a mounting bracket 87 can be attached to the casing 53 and is shown being engaged by a mounting plate 88. Screws 89 are shown for clamping the bracket and the plate upon opposite sides of the panel board 91.

Operation of the regulating device described above is as follows: The inlet passage 11 is connected to a high pressure source as, for example, one or more flasks or tanks containing gas under pressure. This pressure may, for example, be of a value ranging up to 10,000 p.s.i., or higher. Outlet pressure 12 is connected to a lower pressure system which, as previously mentioned, may be closed, or may be such that gas is removed from or applied to the same. Assuming a static condition in which the outlet pressure is being maintained at a desired value, without flow of gas, both the pressure reducing and the relief valve means are closed. Outlet pressure within the space 32 balances the force of the loading spring. When gas is consumed from the outlet side, thus tending to reduce the outlet pressure, the valve assembly moves in a direction to open the valve member 17, with a result that gas is supplied to the outlet from the high pressure side, thus restoring the outlet pressure. If the pressure on the outlet side should build up to a value beyond that desired, then the diaphragm assembly is moved in the opposite direction, whereby the relief valve 46 is opened, thus causing the gas to be vented from the outlet side to the atmosphere.

When the device is initially assembled during manufacture, and without any pressure being applied, the rod 77 is adjusted by turning screw 81, until the end face of rod portion 84 engages the opposed end face of the fitting 44. Then the stem and its associated parts are removed by removing the shell 54 from the body 10, and the nut 85 turned relative to the rod until a predetermined clearance 92 exists between this nut, and the adjacent end 86 of the stem. There is sufficient resistance to the turning of this nut to retain a desired setting and to prevent turning during operation. The device is then reassembled and the rod 77 adjusted to provide a desired margin between operation of the pressure reducing and the relief valve means. If the operator should thereafter attempt to adjust the rod 77 so that the relief valve means is inoperative under any operating condition, nut 85 will engage the stem end 86 before such a dangerous condition is reached. In other words, if the rod 77 is adjusted to bring the nut 85 into engagement with the end 86, then under such conditions, the device will still function as intended, or in other words, the relief valve means will operate to prevent any dangerous increase in downstream pressure.

In addition to providing the safety feature described above, adjustment of the stem 77 not only effects an adjustment with respect to operation of the relief valve means, but in addition changes the limits of movement of the diaphragm. However, in any event the diaphragm is so limited in its movement that it cannot move sufficiently far to cause injury.

I claim:
1. In a fluid pressure regulating device, a body having inlet and outlet passages, a fluid pressure operated diaphragm assembly element carried by the body, the body providing a closed fluid chamber on one side of the diaphragm assembly that is in communication with the outlet passage, pressure-reducing valve means operated by movement of the diaphragm assembly and serving to control flow of fluid from the inlet to the outlet passage, thereby maintaining the pressure in the outlet passage substantially constant, said diaphragm assembly including a rigid member on the other side of the same, relief valve means carried by said rigid member, and relief valve operating means carried by the body on said other side of the diaphragm assembly for engaging and operating said relief valve means responsive to movements of the diaphragm, said relief operating means including an adjustable stop means for limiting the movement of the diaphram in a direction towards said other side, a shoulder, and a limit means adjustable in relation to said stop means and engageable with said shoulder to limit the degree of adjustment of said stop means and thereby prevent excessive adjustment and consequent malfunction of the relief valve.

2. A fluid pressure regulating device in accordance with claim 1 in which said relief valve operating means further includes a hollow stem carried by the body and in which said adjustable stop means comprises a rod disposed axially of the diaphragm within said hollow stem and adjustment means for adjusting the position of said rod with respect to said stem towards and away from said rigid member.

3. A fluid pressure regulating device in accordance with claim 2 in which the end of said hollow stem forms said shoulder and in which said limit means is adjustably carried by said rod.

4. A pressure regulating valve assembly of the character described comprising a valve body having inlet and outlet passages and a pressure chamber therebetween which is in open communication with the outlet passage, a pressure reducing valve communicating said inlet passage with said pressure chamber and a pressure responsive member actuated by pressure in the pressure chamber to open and close said pressure reducing valve to maintain a substantially constant pressure in said chamber; and a pressure relief sub-assembly including a normally closed relief valve moved by said pressure responsive member and a valve actuator for opening said relief valve when it has been moved by said pressure responsive member by reason of a predetermined excess pressure in said pressure chamber, thereby opening the relief valve and relieving pressure in said chamber; and a housing enclosing said sub-assembly, said valve actuator being readily adjustable without removal of the housing, and limit means serving to limit the degree of adjustment of said valve actuator and thereby serving to prevent excessive adjustment thereof and faulty functioning of the valve, said limit means comprising a first, moveable limit member carried by said valve actuator and a second, fixed limit member carried by the housing, said limit members being arranged so that the degree of adjustment of said valve actuator is limited by contact of the two members thereby preventing excessive adjustment thereof and faulty functioning of the relief valve, one of said limit members being adjustable to control the degree of peremissible movement of said pressure responsive member and relief valve without the latter being opened.

5. The assembly of claim 4 wherein said first limit member is adjustable.

References Cited in the file of this patent

UNITED STATES PATENTS

| | | |
|---|---|---|
| 2,342,659 | Grove et al. | Feb. 29, 1944 |
| 2,664,674 | Niesemann | Jan. 5, 1954 |
| 2,845,088 | Crausman et al. | July 29, 1958 |